United States Patent
Mazzaro et al.

(10) Patent No.: US 8,112,252 B2
(45) Date of Patent: Feb. 7, 2012

(54) CONTROL SYSTEM AND METHODS OF VERIFYING OPERATION OF AT LEAST ONE WIND TURBINE SENSOR

(75) Inventors: Maria Cecilia Mazzaro, Simpsonville, SC (US); Mark Edward Cardinal, Altamont, NY (US); Bernardo Adrian Movsichoff, Simpsonville, SC (US); Avinash Taware, Rexford, NY (US); Thomas Dinjus, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/916,153

(22) Filed: Oct. 29, 2010

(65) Prior Publication Data

US 2011/0098975 A1  Apr. 28, 2011

(51) Int. Cl.
G06F 11/30 (2006.01)
F03D 9/00 (2006.01)
(52) U.S. Cl. ............ 702/183; 73/1.01; 290/55; 416/1
(58) Field of Classification Search .......... 702/85, 702/90, 94, 95, 104, 105, 113, 116, 119, 702/150, 181, 183, 185, 186; 73/1.01, 1.29; 416/1, 39, 40, 61, 144; 290/44, 55
See application file for complete search history.

(56) References Cited

U.S. PATENT DOCUMENTS

| 7,249,486 | B2 | 7/2007 | Wobben | |
|---|---|---|---|---|
| 7,552,614 | B2 | 6/2009 | Wobben | |
| 7,677,075 | B2 | 3/2010 | Nies | |
| 2008/0078228 | A1* | 4/2008 | Nies | 73/1.01 |
| 2008/0307853 | A1 | 12/2008 | Siebers et al. | |
| 2009/0295165 | A1* | 12/2009 | Giguere et al. | 290/55 |
| 2010/0119370 | A1 | 5/2010 | Myhr | |

FOREIGN PATENT DOCUMENTS

| EP | 2048562 B1 | 12/2009 |
|---|---|---|
| WO | 2009047061 A1 | 4/2009 |
| WO | 2010037388 A1 | 4/2010 |

* cited by examiner

*Primary Examiner* — John H Le
(74) *Attorney, Agent, or Firm* — James McGinness, Esq.; Armstrong Teasdale LLP

(57) ABSTRACT

A method of verifying operation of at least one wind turbine sensor includes dynamically defining a neighborhood of neighbor wind turbines for a first wind turbine, each neighbor wind turbine including at least one sensor. The method also includes receiving data from at least one neighbor wind turbine sensor and determining a status of at least one sensor of the first wind turbine using the data received from the neighbor wind turbine sensor.

19 Claims, 5 Drawing Sheets

CONTROL SYSTEM AND METHODS OF VERIFYING OPERATION OF AT LEAST ONE WIND TURBINE SENSOR

BACKGROUND OF THE INVENTION

The subject matter described herein relates generally to wind turbines and, more particularly, to a control system and methods of verifying operation of at least one wind turbine sensor.

Generally, a wind turbine includes a rotor that includes a rotatable hub assembly having multiple rotor blades. The rotor blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a tower.

At least some known wind turbines include one or more sensors that measure and/or detect environmental conditions and/or operational conditions within or proximate to the wind turbine. An operation, such as a power generation operation, may rely on receiving accurate measurement data from the sensors. Accordingly, if one or more sensors fail and/or exhibit an abnormal operation, the power generation capability of the wind turbine may be reduced.

At least some known wind turbines verify an operation of one or more sensors using other sensors and/or calculated operating conditions within the wind turbine. Such wind turbines may detect certain errors within the sensors. However, such wind turbines may not accurately detect abnormal behavior of the sensors, such as if the sensors begin to "drift." Such drifting may occur when an output of a sensor deviates, such as progressively deviates, from an expected output with respect to a defined input. Accordingly, such wind turbines may become damaged and/or may be have a reduced power generation capability due to one or more sensor errors.

BRIEF DESCRIPTION OF THE INVENTION

In one embodiment, a method of verifying operation of at least one wind turbine sensor is provided that includes dynamically defining a neighborhood of neighbor wind turbines for a first wind turbine, each neighbor wind turbine including at least one sensor. The method also includes receiving data from at least one neighbor wind turbine sensor and determining a status of at least one sensor of the first wind turbine using the data received from the neighbor wind turbine sensor.

In another embodiment, a method of verifying operation of at least one wind turbine sensor is provided that includes defining a normalization algorithm for normalizing data received from at least one wind turbine. A neighborhood of neighbor wind turbines is defined for a first wind turbine based on the normalization algorithm, wherein each neighbor wind turbine including at least one sensor. Data from at least one neighbor wind turbine sensor is received and a status of at least one sensor of the first wind turbine is determined using the data received from the neighbor wind turbine sensor.

In yet another embodiment, a control system is provided for use with a first wind turbine that includes at least one sensor. The control system includes a processor configured to dynamically define a neighborhood that includes a plurality of wind turbines, wherein each wind turbine of the plurality of wind turbines includes at least one sensor. The processor is also configured to receive data from at least one neighbor wind turbine sensor and determine a status of the sensor of the first wind turbine using the data received from the neighbor wind turbine sensor.

DETAILED DESCRIPTION OF THE INVENTION

The embodiments described herein verify an operation of at least one sensor of a wind turbine under test within a wind farm. A neighborhood of wind turbines is dynamically defined for the wind turbine under test. A normalization algorithm is defined to facilitate determining a relevance of each wind turbine within the neighborhood to the wind turbine under test. Sensor data is received from each neighborhood wind turbine and the sensor data is normalized using the normalization algorithm. The normalized sensor data is compared with sensor data of at least one sensor of the wind turbine under test to determine if the sensor is faulty. If the sensor is determined to be faulty, at least one virtual sensor is created to act as a proxy for the faulty sensor. The virtual sensor is created based on the normalized sensor data received from the neighborhood wind turbines. Accordingly, the embodiments described herein provide a robust and efficient method and control system for verifying an operation of a sensor. Moreover, the embodiments described herein enable a wind turbine to continue operating if a sensor is determined to be faulty.

Figure 1:
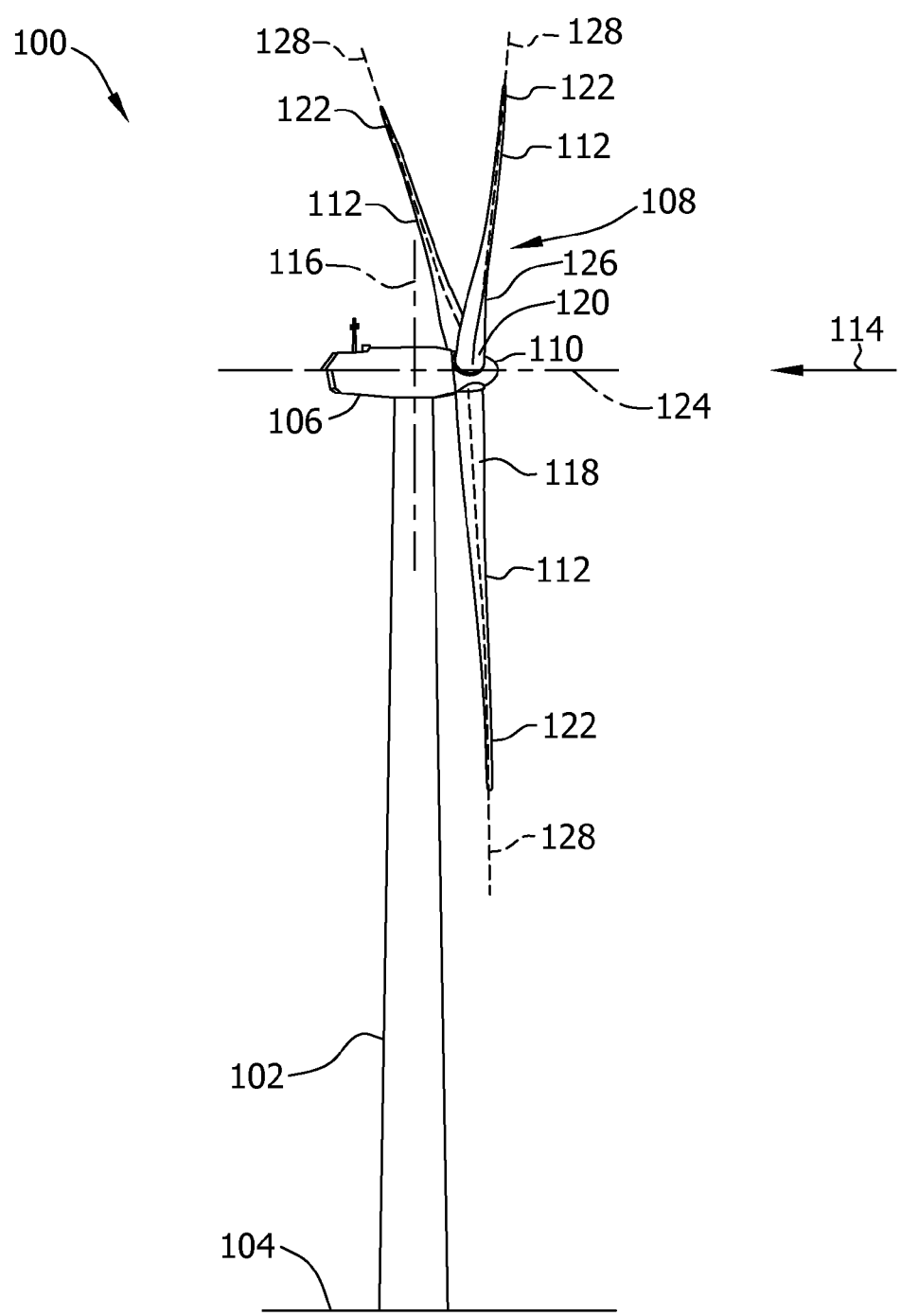
FIG. 1 is a perspective view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating rotor 108, thereby transferring kinetic energy from wind 114 into usable mechanical energy, and subsequently, electrical energy. Rotor 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (both not shown in FIG. 1). Loads induced to rotor blades 112 are transferred to hub 110 via load transfer regions 120. Each rotor blade 112 also includes a rotor blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of rotor 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112. In the exemplary embodiment, the pitch angles of rotor blades 112 are controlled individually.

Figure 2:
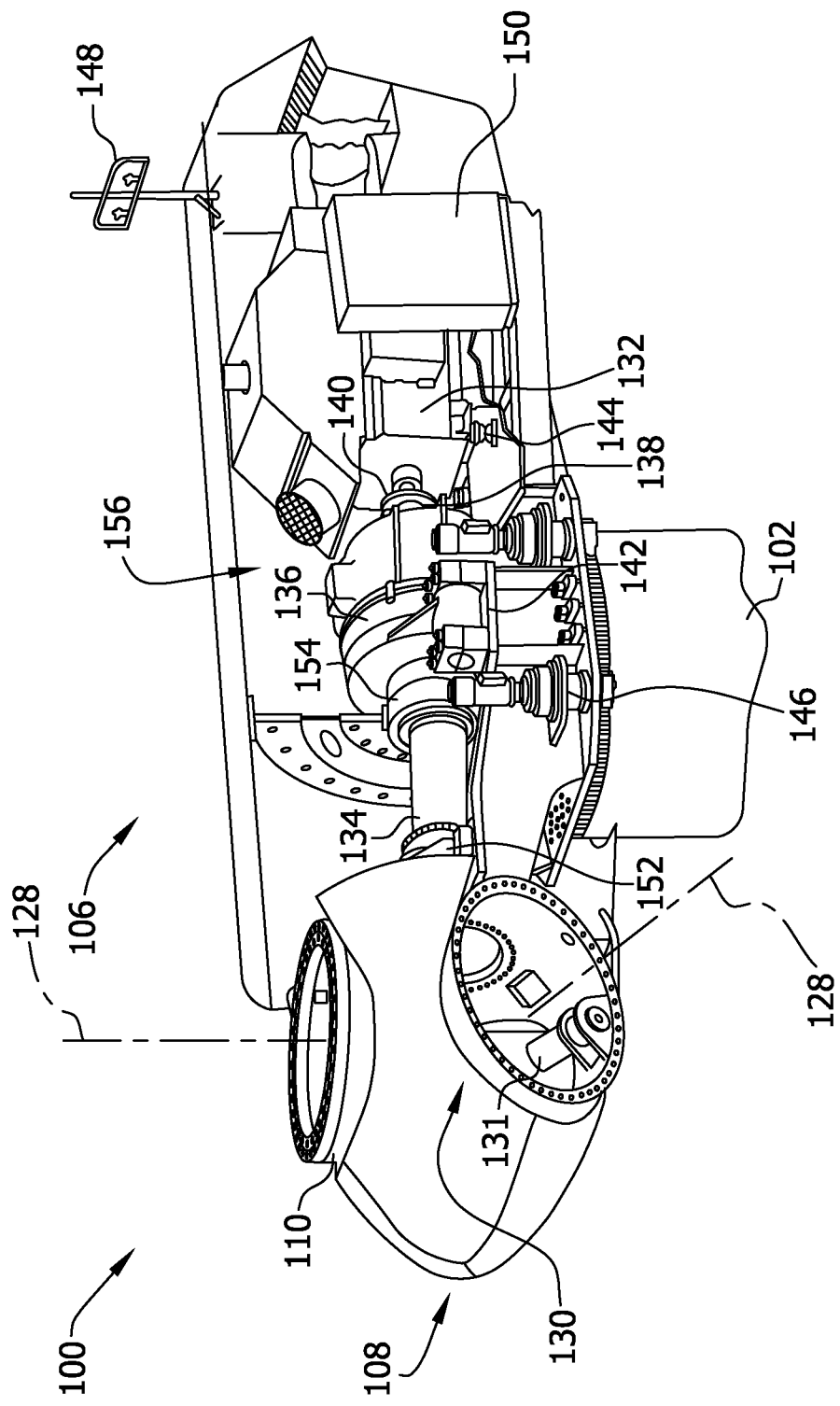
FIG. 2 is a partial sectional view of an exemplary nacelle suitable for use with the wind turbine shown in FIG. 1.

FIG. 2 is a partial sectional view of nacelle 106 of exemplary wind turbine 100 (shown in FIG. 1). Various components of wind turbine 100 are housed in nacelle 106. In the exemplary embodiment, nacelle 106 includes three pitch assemblies 130. Each pitch assembly 130 is coupled to an associated rotor blade 112 (shown in FIG. 1), and modulates a pitch of an associated rotor blade 112 about pitch axis 128. Only one of three pitch assemblies 130 is shown in FIG. 2. In the exemplary embodiment, each pitch assembly 130 includes at least one pitch drive motor 131.

As shown in FIG. 2, rotor 108 is rotatably coupled to an electric generator 132 positioned within nacelle 106 via a rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 via coupling 140 and rotation of high speed shaft 138 facilitates production of electrical power by generator 132. Gearbox 136 is supported by a support 142 and generator 132 is supported by a support 144. In the exemplary embodiment, gearbox 136 utilizes a dual path geometry to drive high speed shaft 138. Alternatively, rotor shaft 134 is coupled directly to generator 132 via coupling 140.

Nacelle 106 also includes a yaw drive mechanism 146 that rotates nacelle 106 and rotor 108 about yaw axis 116 (shown in FIG. 1) to control the perspective of rotor blades 112 with respect to the direction of wind 114. Nacelle 106 also includes at least one meteorological mast 148 that includes a wind vane and anemometer (neither shown in FIG. 2). In one embodiment, meteorological mast 148 provides information, including wind direction and/or wind speed, to a turbine control system 150. Turbine control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, turbine control system 150 may execute a SCADA (Supervisory, Control and Data Acquisition) program.

Pitch assembly 130 is operatively coupled to turbine control system 150. In the exemplary embodiment, nacelle 106 also includes a forward support bearing 152 and an aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Nacelle 106 may include any number of support bearings that enable wind turbine 100 to function as disclosed herein. Rotor shaft 134, generator 132, gearbox 136, high speed shaft 138, coupling 140, and any associated fastening, support, and/or securing device including, but not limited to, support 142, support 144, forward support bearing 152, and aft support bearing 154, are sometimes referred to as a drive train 156.

Figure 3:
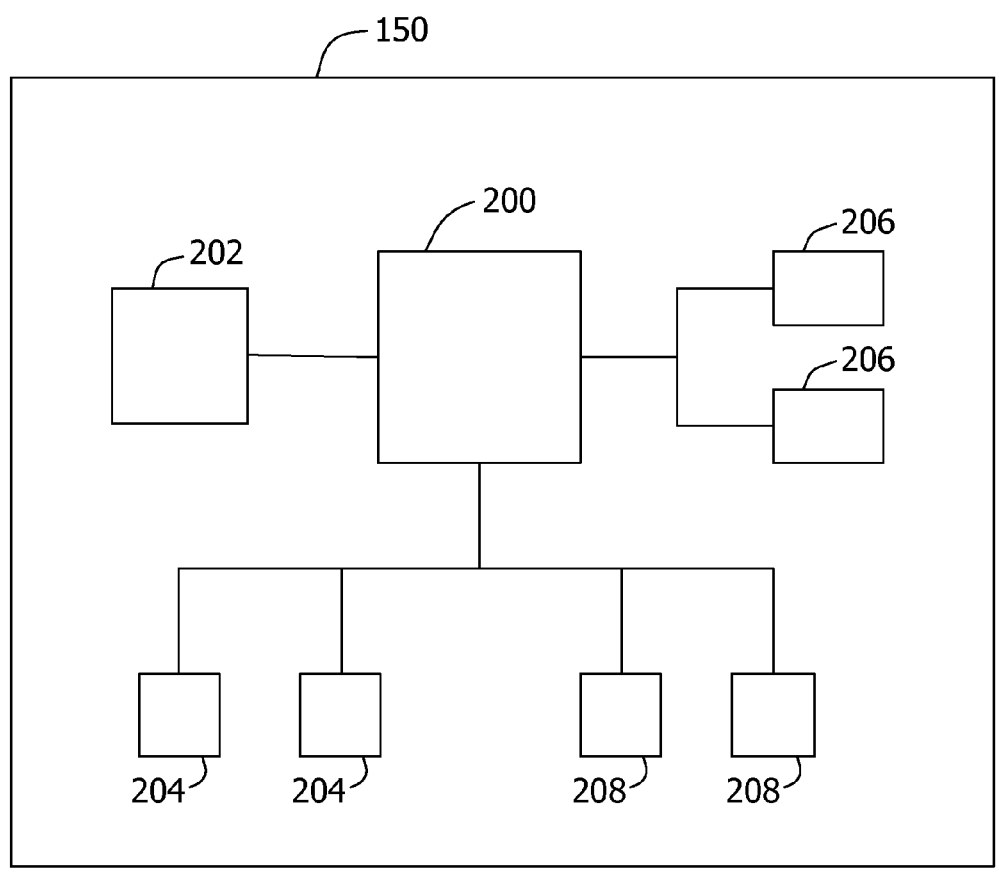
FIG. 3 is a block diagram of an exemplary turbine control system suitable for use with the wind turbine shown in FIG. 1.

FIG. 3 is a block diagram of an exemplary turbine control system 150 that may be used with wind turbine 100 (shown in FIG. 1). In the exemplary embodiment, turbine control system 150 includes a processor 200 that is operatively coupled to a memory device 202, to at least one sensor 204, and to at least one actuator 206. Moreover, in the exemplary embodiment, processor 200 is coupled to, and/or implements, at least one virtual sensor 208.

Memory device 202 includes a computer readable medium, such as, without limitation, random access memory (RAM), flash memory, a hard disk drive, a solid state drive, a diskette, and/or a flash drive. Alternatively, memory device 202 may include any suitable computer readable medium that enables processor 200 to store, retrieve, and/or execute instructions and/or data. Memory device 202 stores and transfers information and instructions to be executed by processor 200.

In the exemplary embodiment, sensors 204 include, for example, one or more of the following: a voltage sensor, a current sensor, a wind speed sensor, a wind direction sensor, an air density sensor, a temperature sensor, an accelerometer, and/or any suitable sensor. Sensors 204 provide measurements of one or more operating conditions of wind turbine 100. In the exemplary embodiment, the measured operating conditions of wind turbine 100 include, without limitation, a generated power, a generated torque, a rotational speed of rotor 108 (shown in FIG. 2), a mechanical loading of one or more components of wind turbine 100, an air density, an altitude, a wind speed, a wind direction, an ambient temperature, and/or any suitable condition at or within wind turbine 100.

Virtual sensors 208, in the exemplary embodiment, provide a proxy for one or more sensors 204. More specifically, as described more fully herein, one or more virtual sensors 208 may provide one or more calculated operating conditions to replace one or more measurements from a malfunctioning and/or unavailable sensor 204.

In the exemplary embodiment, processor 200 receives data from sensors 204 and/or virtual sensors 208 and operates actuators 206 based on the sensor data to adjust a position of one or more components of wind turbine 100. For example, actuators 206 may include and/or may be incorporated within one or more pitch drive motors 131 (shown in FIG. 2), yaw drive mechanism 146 (shown in FIG. 2), and/or any other component that enables wind turbine 100 to operate as described herein.

Figure 4:
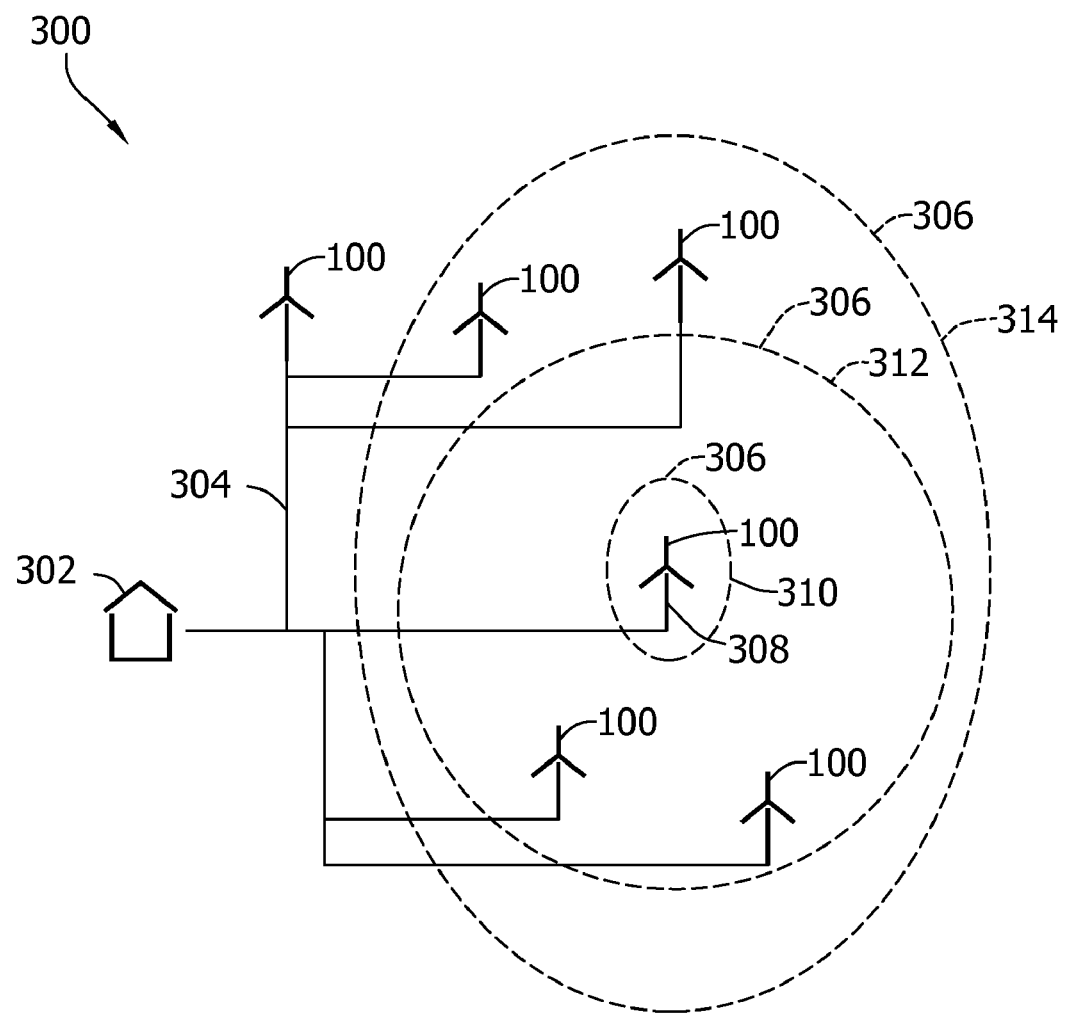
FIG. 4 is a schematic view of an exemplary wind farm that may include the wind turbine shown in FIG. 1.

FIG. 4 is a schematic view of an exemplary wind farm 300. In the exemplary embodiment, wind farm 300 includes a plurality of wind turbines 100 and a wind farm control center 302 that controls and monitors the operation of wind turbines 100 and/or wind farm 300. Wind turbines 100 within wind farm 300 are coupled to each other by a network 304 that interfaces with a respective turbine control system 150 (shown in FIG. 2) of each wind turbine 100. More specifically, wind turbines 100 and/or turbine control systems 150 are coupled together by any suitable network type, including a wired and/or a wireless network 304, that enables each wind turbine 100 and/or turbine control system 150 to transmit and receive data to and from other wind turbines 100 and/or turbine control systems 150 within wind farm 300. Moreover, in the exemplary embodiment, each wind turbine 100 within wind farm 300 is coupled to wind farm control center 302 by network 304.

In the exemplary embodiment, wind turbines 100 are grouped together into one or more neighborhoods 306. More specifically, neighborhoods 306 are defined with respect to a first or selected wind turbine 308. In a particular embodiment, selected wind turbine 308 is a wind turbine under test 308 (i.e., a wind turbine 100 that is in the process of being tested). As described herein, a "wind turbine under test" is not limited to a wind turbine that is executing a formal test or test program. Rather, a wind turbine that executes the methods described herein to verify an operation of one or more sensors may be referred to as a "wind turbine under test." As described more fully herein, neighborhoods 306 may include a first, or initial neighborhood 310, a second, or primary neighborhood 312, and/or a third, or accommodation neighborhood 314. Alternatively, neighborhoods 306 may include any suitable number and/or type of neighborhood. As used herein, the term "neighborhood" refers to an organizational grouping of wind turbines 100 based on a common factor or characteristic. For example, a neighborhood 306 may be defined geographically, such as based on a distance (not shown) between wind turbines 100. A neighborhood 306 may also be defined based on a communication and/or power network, such as network 304, based on similarities of measured operating conditions such as wind speed, based on similar modes of operation, and/or based on any other suitable characteristic or combination of characteristics. Moreover, as described more fully herein, neighborhoods 306 are used to verify an operation of one or more wind turbines 100, such as wind turbine under test 308, and/or to act as a proxy for a faulty sensor 204 of wind turbine under test 308. Moreover, in the exemplary embodiment, neighborhoods 306 identify a group or groups of wind turbines 100 from which wind turbine under test 308 receives data. Wind turbines 100 within a neighborhood 306 may be referred to as "neighbor wind turbines 100."

Figure 5:
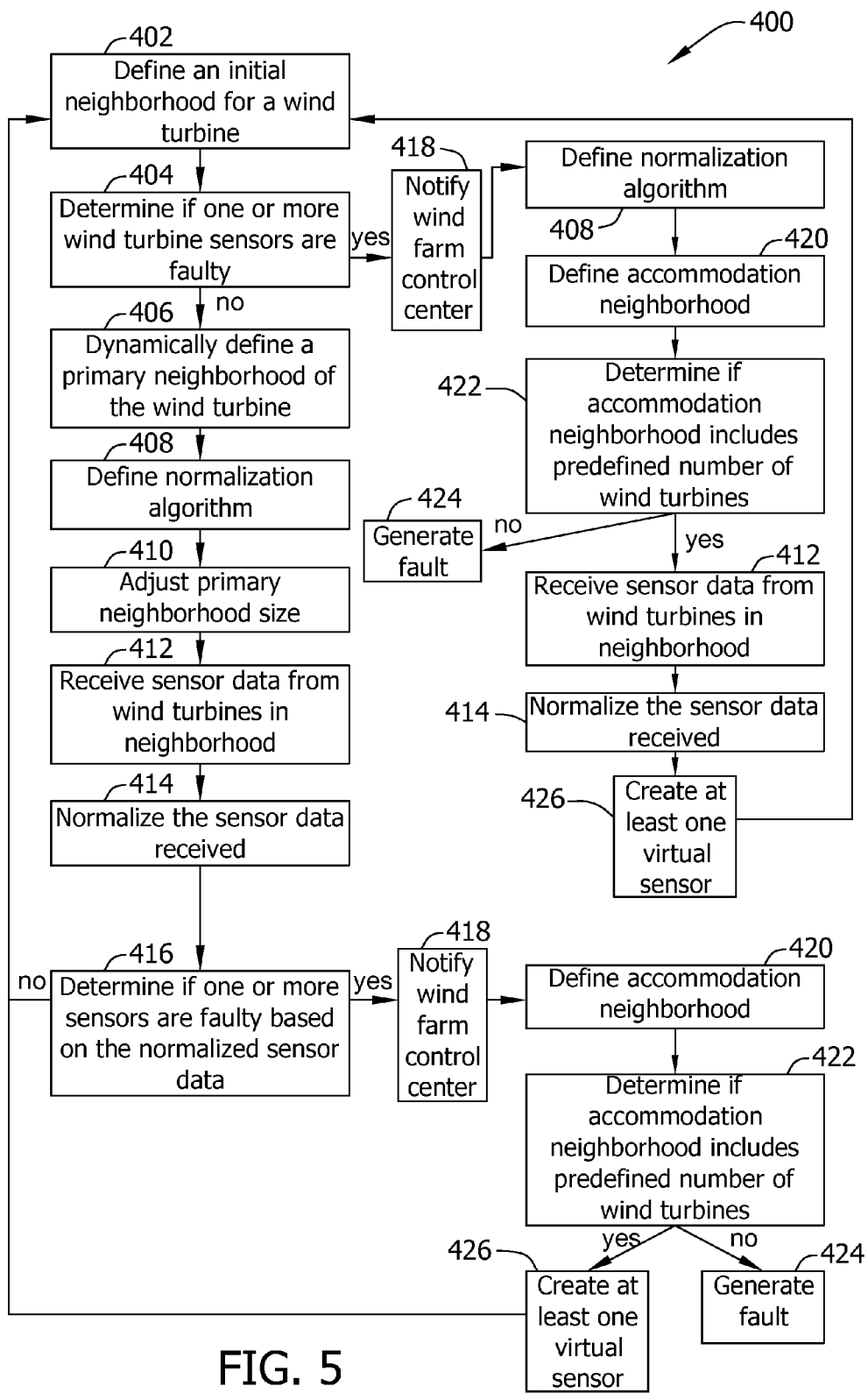
FIG. 5 is a flow diagram of an exemplary method of verifying an operation of at least one wind turbine sensor suitable for use with the wind turbine shown in FIG. 1 and/or within the wind farm shown in FIG. 4.

FIG. 5 is a flow diagram of an exemplary method 400 of verifying an operation of at least one wind turbine sensor, such as at least one sensor 204 of wind turbine 100 (shown in FIG. 1). Method 400 may be executed by wind farm control center 302 (shown in FIG. 4) and/or by turbine control system 150 of wind turbine under test 308 (shown in FIG. 4). In the exemplary embodiment, method 400 is executed by processor 200 (shown in FIG. 3) of turbine control system 150 of each wind turbine 100 within wind farm 300 as the operation of each wind turbine 100 is verified (i.e., as each wind turbine 100 becomes wind turbine under test 308).

In the exemplary embodiment, method 400 includes defining 402 an initial neighborhood, such as initial neighborhood 310 (shown in FIG. 4), for a wind turbine 100. Initial neighborhood 310 is used to determine 404 if one or more sensors 204 of wind turbine under test 308 is faulty. In the exemplary embodiment, as illustrated in FIG. 4, initial neighborhood 310 is defined 402 to only include wind turbine under test 308. As such, wind turbine under test 308 verifies an operation of each sensor 204 by correlating data received from sensor 204 (i.e., the sensor 204 being tested) with data received from other sensors 204 within wind turbine under test 308. Wind turbine under test 308 may use the correlated data to determine, for example, whether sensor 204 is "stuck at" a specific value or values (i.e., whether sensor 204 always transmits the same output despite receiving different inputs), whether sensor 204 is deenergized, and/or whether sensor 204 is otherwise inoperable (hereinafter collectively referred to as one or more "fixed faults"). Alternatively, initial neighborhood 310 is defined 402 to include any suitable wind turbine 100 or wind turbines 100 that enables method 400 to operate as described herein. Still alternatively, an initial neighborhood 310 is not defined 402, and method 400 determines 404 if one or more sensors 204 of wind turbine under test 308 are faulty by comparing data from sensors 204 to data from wind farm control center 302 and/or from other data from wind turbine under test 308.

If sensor 204 is determined 404 to not exhibit a fixed fault, a primary neighborhood, such as primary neighborhood 312 (shown in FIG. 4) of wind turbine under test 308, is dynamically defined 406. As used herein, the term "dynamically defined" refers to a neighborhood that is defined at a first point in time, and at least one aspect of the neighborhood is adjusted or re-defined at a later point in time. As described above, primary neighborhood 312 may be geographically defined, logically defined, and/or defined based on one or more characteristics or relationships between wind turbine under test 308 and one or more wind turbines 100 within wind farm 300 and/or one or more wind turbines 100 outside of wind farm 300. In the exemplary embodiment, primary neighborhood 312 includes a plurality of neighbor wind turbines 100 in addition to wind turbine under test 308.

A normalization algorithm is defined 408 for wind turbine under test 308. In the exemplary embodiment, the normalization algorithm is based on a distance between wind turbine under test 308 and each wind turbine 100 within primary neighborhood 312 and/or within wind farm 300. More specifically, in the exemplary embodiment, the normalization algorithm determines a coefficient for each wind turbine 100 that is inversely proportional to the distance between each wind turbine 100 and wind turbine under test 308. Alternatively, the normalization algorithm may be defined 408 based on a difference between measured wind speeds of wind turbine under test 308 and of each wind turbine 100 within primary neighborhood 312 and/or wind farm 300, a mean square error of the measured wind speeds of wind turbine under test 308 and of each wind turbine 100 within primary neighborhood 312 and/or wind farm 300, a comparison of an operational history and/or operational sequence of wind turbine under test 308 and of each wind turbine 100 within primary neighborhood 312 and/or wind farm 300, and/or any other suitable characteristic of wind turbines 100 and/or wind farm 300. As described more fully herein, the normalization algorithm is used to order and/or weight data from wind turbines 100 to determine the data that is most suitable and/or relevant for use by wind turbine under test 308.

After the normalization algorithm is defined 408, a size of primary neighborhood 312 is adjusted 410. More specifically, in the exemplary embodiment, a normalization coefficient is assigned to each wind turbine 100 based on the normalization algorithm. For example, if the normalization algorithm is based on an inverse of the distance between wind turbines 100 and wind turbine under test 308, then a normalization coefficient that is inversely proportional to the distance is assigned to each wind turbine 100 within wind farm 300. The normalization coefficients are sorted to create an ordered set of coefficient values. A predefined number and/or percentage of coefficient values are selected by identifying the highest values within the set of coefficient values. Alternatively, the lowest values and/or any other suitable criteria may be used to select the predefined number and/or percentage of coefficient values. The size of primary neighborhood 312 is adjusted 410 or set to the number of the selected wind turbines 100 (i.e., wind turbines 100 associated with the selected coefficient values). Accordingly, primary neighborhood 312 is re-defined and/or re-sized to include wind turbines 100 selected herein. Moreover, wind turbines 100 are ranked or ordered by the coefficient values in an increasing or decreasing list representative of how similar each wind turbine 100 is to wind turbine under test 308 for verifying sensor 204 operation.

In the exemplary embodiment, wind turbine under test 308 receives 412 sensor data from wind turbines 100 in primary neighborhood 312. Moreover, the sensor data received 412 from wind turbines 100 within primary neighborhood 312 may include one or more calculated and/or estimated values of one or more operating characteristics and/or parameters of wind turbines 100. Alternatively, wind turbines 100 transmit sensor data to wind farm control center 302, and wind turbine under test 308 receives sensor data for wind turbines 100 in primary neighborhood 312 from wind farm control center 302. Moreover, in the exemplary embodiment, data is only received from the same sensors 204 as a sensor 204 that is being tested in wind turbine under test 308. Alternatively, data for a plurality of sensors 204, such as data from all sensors 204, is received 412 from each wind turbine 100 and/or wind farm control center 302 in primary neighborhood 312.

The received data is normalized 414 based on the normalization algorithm. More specifically, each sensor value received from an individual wind turbine 100 is multiplied by the associated coefficient value for wind turbine 100. Accordingly, the sensor data is normalized or adjusted based on how relevant the sensor data of each wind turbine 100 is to wind turbine under test 308.

Wind turbine under test 308 determines 416 if one or more sensors 204 are faulty based on the normalized sensor data received from wind turbines 100 and/or wind farm control center 302. If wind turbine under test 308 determines 416 that sensors 204 are not faulty, method 400 may define 402 an initial neighborhood for a subsequent sensor 204 and/or for a different wind turbine 100 (i.e., a different wind turbine 100 becomes wind turbine under test 308). If, however, wind turbine under test 308 determines 416 that one or more sensors 204 are faulty, wind turbine under test 308 notifies 418 wind farm control center 302 of the detected fault. Such notification 418 may include, without limitation, transmitting one or more alarm signals or messages to wind farm control center 302, transmitting one or more status signals or messages to wind farm control center 302, and/or any other suitable notification.

In the exemplary embodiment, wind turbine under test 308 defines 420 an accommodation neighborhood, such as accommodation neighborhood 314 (shown in FIG. 4), to provide a proxy for each faulty sensor 204. Moreover, in the exemplary embodiment, primary neighborhood 312 is used as accommodation neighborhood 314. Alternatively, accommodation neighborhood 314 is defined 420 in a similar manner as primary neighborhood 312 is defined 406, although accommodation neighborhood 314 may use a normalization algorithm that is specific to and/or based on the type of fault that has been detected. Moreover, in the exemplary embodiment, wind turbine under test 308 determines 422 if accommodation neighborhood 314 includes a predefined number of wind turbines 100 to provide a sufficient base of sensor data to use as a proxy for faulty sensor 204. If an insufficient number of wind turbines 100 are included within accommodation neighborhood 314 (i.e., if the number of wind turbines 100 is less than the predefined number of wind turbines 100), wind turbine under test 308 does not use accommodation neighborhood 314 as a proxy for faulty sensor 204. Rather, in the exemplary embodiment, wind turbine under test 308 generates 424 a fault and/or shuts down (i.e., stops generating power).

If wind turbine under test 308 determines 422 that accommodation neighborhood 314 includes a sufficient number of wind turbines 100, wind turbine under test 308 creates 426 one or more virtual sensors 208 (shown in FIG. 3) that act as a proxy for faulty sensor 204. In the exemplary embodiment, virtual sensors 208 are software-based models of sensors 204 that generate virtual sensor data as outputs. As such, virtual sensors 208 are at least partially stored in memory device 202 (shown in FIG. 3) and/or are implemented by processor 200 of wind turbine under test 308. Moreover, in the exemplary embodiment, the virtual sensor data is the normalized sensor data received from wind turbines 100 within accommodation neighborhood 314. In other words, wind turbine under test 308 uses the normalized sensor data received from wind turbines 100 in accommodation neighborhood 314 to substitute for data that would otherwise be received from faulty sensor 204. Accordingly, wind turbine under test 308 may continue to operate and generate power using one or more virtual sensors 208 if one or more sensors 204 fail. Moreover, wind turbine under test 308 may derive and/or calculate other suitable operating characteristics or parameters from the virtual sensor data as desired. After one or more virtual sensors 208 are created 426, method 400 may define 402 an initial neighborhood for a subsequent sensor 204 and/or for a different wind turbine 100 (i.e., a different wind turbine 100 becomes wind turbine under test 308).

Referring back to the beginning of method 400, if sensor 204 is determined 404 to have a fixed fault as described above, wind turbine under test 308 notifies 418 wind farm control center 302 of the detected fixed fault. Such notification 418 may include, without limitation, transmitting one or more alarm signals or messages to wind farm control center 302, transmitting one or more status signals or messages to wind farm control center 302, and/or any other suitable notification.

Moreover, in the exemplary embodiment, wind turbine under test 308 defines 408 a normalization algorithm for faulty sensor 204, and defines 420 an accommodation neighborhood, such as accommodation neighborhood 314, to provide a proxy for each sensor 204 that exhibits a fixed fault, in a similar manner as described above. Moreover, as described above, wind turbine under test 308 determines 422 if accommodation neighborhood 314 includes a predefined number of wind turbines 100 to provide a sufficient base of sensor data to use as a proxy for faulty sensor 204. If an insufficient number of wind turbines 100 are included within accommodation neighborhood 314 (i.e., if the number of wind turbines 100 is less than the predefined number of wind turbines 100), wind turbine under test 308 does not use accommodation neighborhood 314 as a proxy for faulty sensor 204. Rather, in the exemplary embodiment, wind turbine under test 308 generates 424 a fault and/or shuts down (i.e., stops generating power).

If wind turbine under test 308 determines 422 that accommodation neighborhood 314 includes a sufficient number of wind turbines 100, wind turbine under test 308 receives 412 sensor data from wind turbines 100 within accommodation neighborhood 314. The sensor data is normalized 414, as described above, using the normalization algorithm. Wind turbine under test 308 creates 426 one or more virtual sensors 208 that act as a proxy for faulty sensor 204, and wind turbine under test 308 may derive and/or calculate other suitable operating characteristics or parameters from the virtual sensor data as desired. After one or more virtual sensors 208 are created 426, method 400 may define 402 an initial neighborhood for a subsequent sensor 204 and/or for a different wind turbine 100 (i.e., a different wind turbine 100 becomes wind turbine under test 308).

While method 400 is described herein as relating to wind turbines 100 within wind farm 300, it should be recognized that method 400 may also be executed among wind turbines 100 of a plurality of wind farms 300. As such, for example, one or more neighborhoods 306 may span a plurality of wind farms 300.

A technical effect of the system and method described herein includes at least one of: (a) dynamically defining a neighborhood of neighbor wind turbines for a wind turbine under test, each neighbor wind turbine including at least one sensor; (b) receiving data from at least one neighbor wind turbine sensor; and (c) determining a status of at least one sensor of a wind turbine under test using data received from at least one neighbor wind turbine sensor.

The above-described embodiments provide an efficient and robust method of verifying an operation of a wind turbine sensor. A neighborhood of wind turbines is dynamically defined for a wind turbine under test. A normalization algorithm is defined for use in determining a relevance of each wind turbine within the neighborhood to the wind turbine under test. Sensor data is received from each neighbor wind turbine and the sensor data is normalized using the normalization algorithm. The normalized sensor data is compared with sensor data of at least one sensor of the wind turbine under test to determine if the sensor is faulty. If the sensor is determined to be faulty, at least one virtual sensor is created to act as a proxy for the faulty sensor. The virtual sensor is created based on the normalized sensor data received from the neighbor wind turbines. In contrast, at least some prior art wind turbines verify an operation of one or more wind turbine sensors using only sensors within the wind turbine. Accordingly, the embodiments described herein provide a robust and efficient method and control system for verifying an operation of a sensor. Moreover, the embodiments described herein enable a wind turbine to continue operating if a sensor is determined to be faulty.

Exemplary embodiments of a control system and methods of verifying an operation of at least one wind turbine sensor are described above in detail. The control system and methods are not limited to the specific embodiments described herein, but rather, components of the control system and/or steps of the methods may be utilized independently and separately from other components and/or steps described herein. For example, the methods may also be used in combination with other wind farms and control systems, and is not limited to practice with only the wind farm and control system as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of verifying operation of at least one wind turbine sensor, said method comprising:
    dynamically defining a neighborhood of neighbor wind turbines for a first wind turbine, each neighbor wind turbine including at least one sensor;
    receiving, by a processor, data from at least one neighbor wind turbine sensor;
    defining a normalization algorithm for the first wind turbine, the normalization algorithm used to normalize data received from the neighbor wind turbine sensor; and,
    determining a status of at least one sensor of the first wind turbine using the data received from the neighbor wind turbine sensor.

2. A method in accordance with claim 1, further comprising providing a proxy for the sensor of the first wind turbine if the sensor is determined to be faulty.

3. A method in accordance with claim 1, wherein said dynamically defining a neighborhood of neighbor wind turbines comprises:
    defining a primary neighborhood for the first wind turbine; and,
    adjusting a size of the primary neighborhood.

4. A method in accordance with claim 1, further comprising adjusting a size of the neighborhood based on the normalization algorithm.

5. A method in accordance with claim 1, wherein said determining a status of at least one sensor of the first wind turbine comprises comparing the normalized data to data received from the sensor of the first wind turbine.

6. A method in accordance with claim 1, further comprising defining an accommodation neighborhood for the first wind turbine if the sensor of the first wind turbine is determined to be faulty, wherein the accommodation neighborhood includes at least one wind turbine.

7. A method in accordance with claim 6, further comprising creating at least one virtual sensor based on data received from the wind turbine within the accommodation neighborhood, the virtual sensor configured to act as a proxy for the faulty sensor.

8. A method in accordance with claim 6, further comprising determining whether the accommodation neighborhood includes a predefined number of wind turbines.

9. A method in accordance with claim 8, further comprising generating a fault if the accommodation neighborhood does not include the predefined number of wind turbines.

10. A method of verifying operation of at least one wind turbine sensor, said method comprising:

defining a normalization algorithm for normalizing data received from at least one wind turbine;

defining a neighborhood of neighbor wind turbines for a first wind turbine based on the normalization algorithm, each neighbor wind turbine including at least one sensor;

receiving, by a processor, data from at least one neighbor wind turbine sensor;

normalizing the data received from the neighbor wind turbine sensor using the normalization algorithm; and, determining a status of at least one sensor of the first wind turbine using the data received from the neighbor wind turbine sensor.

11. A method in accordance with claim 10, further comprising providing a proxy for the sensor of the first wind turbine if the sensor is determined to be faulty.

12. A method in accordance with claim 10, further comprising:

defining a primary neighborhood for the first wind turbine; and, adjusting a size of the primary neighborhood.

13. A method in accordance with claim 10, wherein said determining a status of at least one sensor of the first wind turbine comprises comparing the normalized data to data received from the sensor of the first wind turbine.

14. A method in accordance with claim 10, further comprising defining an accommodation neighborhood for the first wind turbine if the sensor of the first wind turbine is determined to be faulty, wherein the accommodation neighborhood includes at least one wind turbine.

15. A method in accordance with claim 14, further comprising creating at least one virtual sensor based on data received from the wind turbine within the accommodation neighborhood, the virtual sensor configured to act as a proxy for the faulty sensor.

16. A control system for use with a first wind turbine that includes at least one sensor, said control system comprising a processor configured to:

dynamically define a neighborhood that includes a plurality of wind turbines, each wind turbine of the plurality of wind turbines including at least one sensor;

receive data from at least one neighbor wind turbine sensor;

normalize the data received from the neighbor wind turbine sensor using a normalization algorithm; and, determine a status of the sensor of the first wind turbine using the data received from the neighbor wind turbine sensor.

17. A control system in accordance with claim 16, wherein said processor is further configured to:

define a primary neighborhood for the first wind turbine; and, adjust a size of the primary neighborhood.

18. A control system in accordance with claim 16, wherein said processor is further configured to define an accommodation neighborhood for the first wind turbine if the sensor of the first wind turbine is determined to be faulty, wherein the accommodation neighborhood includes at least one wind turbine.

19. A control system in accordance with claim 18, wherein said processor is further configured to create at least one virtual sensor based on data received from the wind turbine within the accommodation neighborhood, wherein the virtual sensor is configured to act as a proxy for the faulty sensor.

* * * * *